United States Patent [19]

Parsons et al.

[11] Patent Number: 5,851,663
[45] Date of Patent: Dec. 22, 1998

[54] FLAME RETARDANT PRESSURE-SENSITIVE ADHESIVES AND TAPES

[75] Inventors: Keith P. Parsons, Bishops Stortford; Mark R. Buckingham, Sawston, both of United Kingdom; James H. Diamond, Austin, Tex.; Steven J. Ilkka, Oakdale, Minn.; Petra Nowak, Ubach-Palenberg, Germany

[73] Assignee: Minnesota Mining and Manufacturing Company, St. Paul, Minn.

[21] Appl. No.: 737,689

[22] PCT Filed: May 19, 1995

[86] PCT No.: PCT/US95/06388

§ 371 Date: Nov. 15, 1996

§ 102(e) Date: Nov. 15, 1996

[87] PCT Pub. No.: WO95/32257

PCT Pub. Date: Nov. 30, 1995

[30] Foreign Application Priority Data

May 25, 1994 [GB] United Kingdom ............... 9410444

[51] Int. Cl.⁶ ............... B32B 7/12; B32B 15/04; C08K 3/32
[52] U.S. Cl. ............... 428/355; 428/356; 428/352; 428/921; 523/179; 524/415; 524/416
[58] Field of Search ............... 523/179; 428/355, 428/356, 921, 352; 524/415, 416

[56] References Cited

U.S. PATENT DOCUMENTS

| | | | |
|---|---|---|---|
| 2,755,260 | 7/1956 | St. Ibert et al. | 423/179 |
| 3,336,153 | 8/1967 | Juda | 428/924 |
| 3,449,161 | 6/1969 | Hindersinn et al. | 428/921 |
| 3,515,578 | 6/1970 | Tomita et al. | 117/122 |
| 3,843,590 | 10/1974 | Hombach et al. | 260/33.6 A |
| 3,923,722 | 12/1975 | Lakshmanan | 260/32.8 A |
| 3,934,066 | 1/1976 | Murch | 428/921 |
| 4,052,483 | 10/1977 | Feeney et al. | 526/86 |
| 4,061,826 | 12/1977 | Petras et al. | |
| 4,207,374 | 6/1980 | Groff. | |
| 4,217,434 | 8/1980 | Koeble | 525/329 |
| 4,223,067 | 9/1980 | Levens. | |
| 4,239,670 | 12/1980 | Moorman | 524/416 |
| 4,359,551 | 11/1982 | Suda et al. | 524/271 |
| 4,415,615 | 11/1983 | Esmay et al. | |
| 4,415,618 | 11/1983 | McClung, Jr. | 428/88 |
| 4,440,888 | 4/1984 | Cook et al. | 524/139 |
| 4,496,685 | 1/1985 | Nagasawa et al. | |
| 4,569,960 | 2/1986 | Blake | 524/145 |
| 4,599,265 | 7/1986 | Esmay | 428/355 |
| 4,699,824 | 10/1987 | Pufahl | 428/220 |
| 4,710,536 | 12/1987 | Klingen et al. | 524/493 |
| 4,880,681 | 11/1989 | Price et al. | 524/416 |
| 5,010,113 | 4/1991 | Bount. | |
| 5,116,676 | 5/1992 | Winslow | 428/343 |
| 5,153,245 | 10/1992 | Cipolli et al. | 524/416 |
| 5,192,612 | 3/1993 | Otter et al. | 428/355 RA |
| 5,198,483 | 3/1993 | Gainer | 524/100 |
| 5,200,445 | 4/1993 | Cipolli et al. | |
| 5,225,463 | 7/1993 | Cipolli et al. | 524/416 |
| 5,284,889 | 2/1994 | Pyun et al. | |
| 5,286,775 | 2/1994 | Bandyopadhyay. | |
| 5,409,976 | 4/1995 | Lindsay. | |
| 5,416,134 | 5/1995 | Skoglund | 523/201 |
| 5,496,636 | 3/1996 | Gu et al. | 428/352 |
| 5,498,476 | 3/1996 | Tucker et al. | |
| 5,502,937 | 4/1996 | Wilson. | |
| 5,591,791 | 1/1997 | Deogon. | |
| 5,650,215 | 7/1997 | Mazurek et al. | 428/355 BL |
| 5,654,063 | 8/1997 | Kirk et al. | |
| 5,686,039 | 11/1997 | Merry. | |
| 5,723,515 | 3/1998 | Gottfried. | |

FOREIGN PATENT DOCUMENTS

| | | | |
|---|---|---|---|
| 0 204 027 | 12/1986 | European Pat. Off. | |
| 0 257 984 | 3/1988 | European Pat. Off. | |
| 0 301 764 A2 | 7/1988 | European Pat. Off. | C09J 7/02 |
| 0 413 613 A1 | 2/1991 | European Pat. Off. | |
| 2938874 | 4/1981 | Germany | 523/179 |
| 50-44234 | 4/1975 | Japan | C09J 3/14 |
| 70108692 | 5/1975 | Japan. | |
| 55-155075 | 12/1980 | Japan | C09J 3/16 |
| 56-116768 | 9/1981 | Japan | C09J 3/14 |
| 58-127746 | 7/1983 | Japan. | |
| 62-151482 | 7/1987 | Japan | C09J 3/14 |
| 01-54078 | 3/1989 | Japan. | |
| 1-234485 | 9/1989 | Japan | C09J 3/14 |
| 5-345882 | 12/1993 | Japan | C09J 7/02 |
| 0789556 | 12/1980 | U.S.S.R. | |
| 789556 | 12/1980 | U.S.S.R. | |
| 2 272 444 A | 5/1984 | United Kingdom. | |
| 2245286 | 1/1992 | United Kingdom. | |
| 2272444 | 5/1994 | United Kingdom. | |
| WO 90/01411 | 2/1990 | WIPO | B32B 5/12 |
| WO 93/22373 | 11/1993 | WIPO. | |
| WO 94/11425 | 5/1994 | WIPO. | |

OTHER PUBLICATIONS

WO–93/22373 published Nov. 11, 1993.
Weil, E.D., in Flame Retardancy of Polymeric Materials, eds. W.C. Kuryla and A.J. Papa. pp. 185ff, Marcel Dekker, New York, 1975.
"The Cone Caloricmeter–A New Tool for Fire Safety Engineering,"ASTM Standarisation News, 18, 32–5, Jan. 1990.
Dialog Accession No. 009760258–JP 05345881A (with English language abstract), Dec. 27, 1993.
"Flame Retardant Polymers Current Status and Future Trends," *Die Makromolekulare Chemie: Macromolecular Symposia*, 1993, vol. 74, pp. 125–135.
Troitzsch, Jurgen (ed.), *International Plastics Flammability Handbook*, Hanser Publishers, Munich, 1990, pp. 52–53.
Satas, Donatas (ed.), "Modifying Resins for Acrylic Polymers," *Handbook of Pressure Sensitive Adhesive Technology*, New York, 1989, pp. 567–600.
"The Relationship Between Thermal Degradation and Flammability," *Die Makromolekulare Chemie: Macromolecular Symposia*, 1993, vol. 74, pp. 11–20.

Primary Examiner—Veronica P. Hoke
Attorney, Agent, or Firm—Lisa M. McGeehan

[57] ABSTRACT

A pressure-sensitive adhesive composition comprises an adhesive selected from the group consisting of rubber resin adhesives and acrylic adhesives containing from about 10 to about 60% by weight of the adhesive of a non-halogen intumescent flame retardant.

17 Claims, 3 Drawing Sheets

FLAME RETARDANT PRESSURE-SENSITIVE ADHESIVES AND TAPES

FIELD OF THE INVENTION

This invention relates to pressure-sensitive adhesive compositions containing non-halogen intumescent flame retardant (NHIFR) additives and to flame retardant pressure-sensitive adhesive tapes.

BACKGROUND OF THE INVENTION

Pressure-sensitive adhesives find use in a wide variety of applications, such as the automotive, aerospace, construction and electrical markets, either in the form of tapes or as adhesive coatings on other backings. For many of these applications, good flame retardant properties are of considerable importance. This performance has generally been achieved by means of the incorporation of halogenated, often brominated flame retardant additives into the adhesive formulation, as disclosed for example, in U.S. Pat. No. 4,061,826. Although efficient as flame retardants, these types of materials have considerable drawbacks in terms of smoke production and toxicity concerns, relating both to combustion products and also to disposal of the compounds themselves. Hence, there is considerable momentum towards the reduction in use or replacement of these flame retardants by zero halogen alternatives.

A further limitation of the use of halogenated flame retardants in pressure-sensitive adhesives is that during combustion they emit larger amounts of corrosive smoke. Combustion products of halogen containing materials, in particular HCl and HBr, contribute significantly to these effects. The corrosivity of smoke is of particular importance in electrical/electronic applications, since a small fire involving halogenated insulation materials may generate sufficient corrosive combustion products to cause widespread damage to other equipment not directly involved in the fire.

It has been suggested there is a synergistic interaction between phosphorus based and halogenated flame retardant additives. However, a detailed review on this subject (Weil, Ph.D., in Flame retardancy of polymeric materials, eds. W. C. Kuryla and A. J. Papa, pp. 185ff, Marcel Dekker, N.Y., 1975) concludes that the evidence for phosphorus halogen synergism is too weak to call for any explanation.

NHIFR materials have been used in adhesives, but the majority of the systems disclosed do not comprise pressure-sensitive adhesives.

Known adhesives having flame retardants are commonly based upon epoxy resins e.g. JP 70108692 (Nitto Koseki KK) which describes the use of nitrogen containing phosphates such as melamine phosphate in epoxy adhesives, or polyurethanes e.g. U.S. Pat. No. 5,010,113 (Blount) which describes the use of urea-phosphoric acid salts as flame retardants for flexible polyurethane foams, with adhesives as one suggested application.

U.S. Pat. No. 4,496,685 (Sumitomo Chemical KK) discloses the use of a variety of phosphazenes in cyanoacrylate adhesives. Although flame retardant behavior is mentioned as an issue, the main focus of the disclosure is directed towards the stabilization properties of the phosphazenes resulting in improved storage stability of the resins.

SU 789556 (Channova) describes fire resistant adhesives consisting of butyl acrylate methacrylic acid copolymers with a mixture of borax, boric acid and ammonium phosphate as the fire retardant. However, the adhesives are not pressure-sensitive adhesives.

The prior art does not disclose flame retardant pressure-sensitive adhesive compositions.

SUMMARY OF THE INVENTION

According to one aspect of the present invention there is provided a pressure-sensitive adhesive composition containing a non-halogen intumescent flame retardant.

DETAILED DESCRIPTION OF THE PREFERRED EMBODIMENTS

Figure 2:
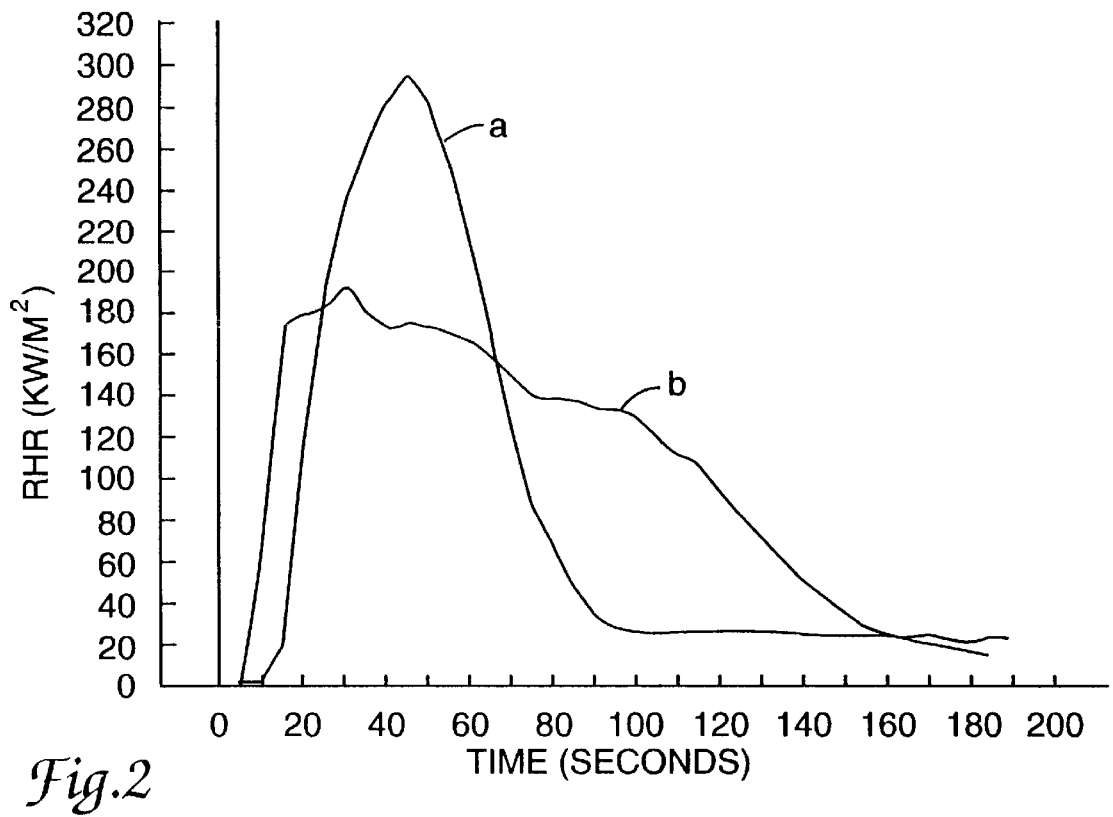
FIGS. 1 and 2 are graphical representations of rate of heat release data for compositions of the present invention.

The pressure-sensitive adhesive compositions may be based on a wide variety of adhesives including rubber based compositions, acrylic adhesive compositions and adhesive foams. The adhesive compositions have a wide variety of applications and are particularly suitable for use in the preparation of adhesive tapes.

The compositions of the invention possess an excellent combination of flame retardant and adhesive characteristics. In the case where solely NHIFR additives are used, reductions in smoke emission, and also in combustion toxicity and corrosivity, representing improvements upon the art are conferred by a completely non-halogen composition. However, other flame retardants may be present and in the case where combinations of NHIFR and halogenated flame retardant additives are used together, a synergistic effect is seen in flammability performance in rubber based compositions, with a surprising reduction in the tendency to produce burning drips during combustion. In addition, such combinations permit a reduction in the loading of halogenated flame retardant additive.

In one embodiment, the flame retardant is one or more NHIFR materials. Such materials normally contain up to three components: a carbonific, an acid forming catalyst, and a blowing agent. These three functions may be contained in only one or two chemicals. Such materials usually contain phosphorus compounds, and often also contain compounds of nitrogen, and are known as P/N flame retardants.

In another embodiment, a blend of at least two flame retardant additives are used, with a combination of a NHIFR material with a halogenated, for example, a brominated additive.

A wide variety of non-halogen phosphorus/nitrogen flame retardants are useful in the invention.

Suitable flame retardants disclosed in EP 0115871 comprise a nitrogen containing oligomer and ammonium polyphosphate. An example is commercially available under the trade name SPINFLAM MF82.

Other suitable flame retardants, which are available under the trade name EXOLIT IFR-10 and EXOLIT IFR-23, comprise ammonium polyphosphate in admixture with a variety of other flame retardant synergists and co-agents, fillers and pigments.

Other suitable flame retardants are disclosed in EP 0204027 and comprise mixtures of ammonium polyphosphate, melamine cyanurate and a hydroxyalkyl derivative of isocyanuric acid, at least partially in the form of a homopolymer. Examples of these materials are commercially available under the trade name MASTERFLAM.

Other suitable flame retardants are disclosed in EP 0413613A and comprise oligomeric phosphorus/nitrogen flame retardants containing a triazine nucleus, used in conjunction with ammonium polyphosphate.

Other suitable flame retardants are disclosed in British Patent Application No. 9208926.7 and comprise a polyphosphonamide derivative used in conjunction with ammonium polyphosphate.

Another useful class are the phosphate salts of polyols such as pentaerythritol e.g. Great Lakes CN1197.

A useful class of halogenated flame retardants for use in combination with NHIFR materials are the halogenated polynuclear aromatic ethers, for example, decabromodiphenyl oxide (DBDPO).

The flame retardants are generally employed in amounts in the range 10 to 100 parts by weight, preferably 25 to 75 parts by weight per 100 parts by weight of the pressure-sensitive adhesive. In some cases, particularly when large amounts of flame retardant are employed, there will be a reduction in the tackiness of the adhesive composition. This problem may readily be overcome by overcoating such an adhesive composition with a thin layer e.g. 125 microns or less, preferably 5 to 10 microns, of adhesive containing no flame retardant additive or a low level of flame retardant additive which does not inhibit the tackiness of the adhesive. The overall two layer combination displays good tack and adhesive properties and surprisingly the presence of the top coat does not detract from the flame retardant performance.

The flame retardant(s) may be incorporated in the adhesive by conventional techniques such as ball-milling, and thereafter the pressure-sensitive adhesive composition may be applied to a substrate in order to confer adhesive properties thereon. The substrate may comprise a wide variety of materials such as plastics (including plastic films), paper, metal, wood, glass, cloth, etc. The substrate may have release properties (e.g. silicone coated paper on film) such that the adhesive may be transferred to a second substrate by a process of lamination followed by peeling of the first substrate. Depending on the size, shape and flexibility of the substrate, the adhesive composition may be applied by any conventional technique such as brushing, dipping, spraying etc., but most commonly the substrate is in the form of a flexible continuous web and the adhesive is applied by a method such as knife-coating, roller coating, extrusion, lamination, etc. The adhesive may be applied as a solution in organic solvent, as an aqueous emulsion or as a 100% solids formulation as appropriate. The adhesive layer may be crosslinked subsequent to application to the backing, e.g. by UV or e-beam curing, in order to modify its adhesive properties, in accordance with known techniques. Coated webs may be slit into narrow strips to form tapes, or otherwise converted into articles of the required dimensions.

A pressure-sensitive adhesive tape using the adhesive of the invention may incorporate a variety of tape backings. For a particularly flame resistant tape, the backing may be glass cloth. Other useful backings include films of polyethylene terephthalate (PET), polyimide and polyolefin copolymers. The adhesive composition can be applied to the backing from solution, by hot melt coating, extrusion, or lamination of a preformed film from a release liner, in a variety of thicknesses ranging from a few microns to several millimeters, sufficient to provide the desired adhesion and other properties. Generally thin layer adhesives refer to those of about 125 microns or less. Foam adhesives are generally in the range 0.1 to 2.5 mm. The backing may be coated with the adhesive in the form of a continuous web which is then slit in the longitudinal direction to form tapes of the desired width.

Tapes in accordance with the invention may be suitable for electrical, industrial, transportation, military and electronic applications. The tapes may be in a variety of forms e.g. simple coated substrate, double-sided, etc.

The compositions of the invention may comprise any pressure-sensitive adhesive.

In one embodiment the base pressure-sensitive adhesive material of a composition of the invention can be selected from a wide variety of rubber resin based materials. These comprise an elastomeric ingredient such as crude natural rubber, styrene-butadiene elastomer, polybutadiene, polyisobutylene and polysiloxane, and a tackifying resin such as glyceryl esters of hydrogenated resin, thermoplastic terpene resins, petroleum hydrocarbon resins, coumarone-indene resin, synthetic phenol resins, low molecular weight polybutenes and tackifying silicone resins. Some elastomers may be at least partially self tackified, as when low molecular weight fractions tackify the high molecular weight fractions of the elastomer. Generally a tackifying resin is included in a proportion of 40 parts to 150 parts per 100 parts of base elastomer. Tapes using such adhesive compositions generally comprise a suitable backing coated with an approximately 1 mil thick layer of rubber resin adhesive containing up to 60% by weight of one or more flame retardant materials, and optionally contain pigments, fillers and/or tackifying agents.

The overall composition displays good flammability properties, as exemplified by performance in the UL510 flammability test, good adhesive characteristics and low smoke and toxic gas production upon combustion.

In a second embodiment, the base pressure-sensitive adhesive is an acrylic adhesive. The acrylic pressure-sensitive adhesive material used in the invention can be selected from a wide variety of polymers and copolymers derived from acrylic and/or methacrylic acid, or ester, amide and nitrile derivatives thereof. Mixtures of different polymers and copolymers can be used. The polymers and copolymers preferably are of low $T_g$ (e.g. <0° C.) so that the mass of polymer is tacky at ambient temperatures, and no additional tackifying resin is required. Examples of useful acrylate based materials include homopolymers and copolymers of acrylic acid, methacrylic acid, isooctyl acrylate, acrylamide, methacrylamide, acrylonitrile, methacrylonitrile, methyl isoamyl acrylate, 2-ethyl hexylacrylate, and butyl acrylate.

For certain applications, particularly application to rough surfaces, it is necessary for the adhesive layer to be relatively thick, e.g. 0.2 to 2.5 mm. Such thick coatings of adhesive tend to be difficult and expensive to manufacture by traditional adhesive coating formulations and so called "foam" pressure-sensitive adhesives have been developed. Such adhesives may be in the form of the foam having open or closed cells throughout the adhesive generated by frothing or a cellular structure may be achieved by the incorporation of hollow microspheres e.g. glass or polymeric microbubbles, into the adhesive formulation e.g. to occupy 20 to 65% of the volume of the adhesive. Examples of foam adhesives are disclosed in U.S. Pat. No. 4,223,067, U.S. Pat. No. 4,415,615 and EP 257984.

The pressure-sensitive adhesive materials, particularly acrylate based materials, may also include glass bubbles, typically at levels up to 10 parts per 100 parts of acrylate material. They may also include ultra violet curing agents such as Irgacure 651 (Ciba Geigy), typically at levels of up to 1 part per 100 parts of acrylate material to enable partial crosslinking to be accomplished by means of exposure to a UV source.

A typical foam tape of this invention consists of an acrylic adhesive foam, of thickness approximated 1 mm, containing up to 60% by weight of a phosphorus/nitrogen flame retardant, glass microspheres and other co-agents and optionally cured by ultraviolet light. The overall composition displays good flammability properties and low smoke and toxic gas production as exemplified by cone calorimeter performance. The acrylic adhesive foam may be self-supporting, supported by a release liner or may be bonded to a backing.

A useful test for determining the flammability properties of adhesive tape compositions of this invention is the UL510 tape flammability test. In order to pass this test, burn times of less than 60 s must be observed following each of five successive 15 s Bunsen applications to a vertical tape wrapped steel rod. In addition there must be no emission of flaming drips and the length of burnt material must not extend to a paper flag placed 10 inches above the point of impact of the Bunsen flame.

A further useful method for classifying the flammability properties of the materials of this invention is evaluation on the cone calorimeter. This instrument is described in detail in "The cone calorimeter—a new tool for fire safety engineering", ASTM Standardization News, 18, 32–5, January 1990, and in ASTM test method E1354-90. Adhesive tape compositions were evaluated using a cone calorimeter at an external irradiant flux of 50 kW m$^-$ and an exposed specimen surface area of 10 cm$^-$. In addition to flammability data such as rate of heat release, cone calorimeter evaluation yields data describing the smoke and toxic gas production behavior of materials.

A useful method for flammability performance assessment is the Underwriters Laboratories UL94 test. This is a widely accepted test method and is commonly used by suppliers of flame retardants and flame retardant materials. In this test a vertically clamped specimen is ignited by a specified flame from a Bunsen burner. For good performance in the test the specimen must self extinguish satisfactorily and not emit any flaming drips. UL94 defines the specimen size as 12.7 cm (5 inches) long and 1.27 cm (½ inch) wide. UL94 performance is thickness dependent and is quoted here for specimens of thickness 1 mm.

Adhesive performance can be measured in a number of ways. One method used herein (Examples 16 and 20) was a rolling tube test, similar in form, although not corresponding to, the rolling ball tack test ASTM D 3121. In this test a tube of diameter 1.3 inches (3.3 cm) and mass 138 g was released from a point 6 inches (15 cm) up a slope inclined at 10° to the horizontal. The lower end of the inclined slope impinged upon the surface of the specimen. When the tube was released, the distance it traveled along the specimen surface from the lower end of the incline before coming to rest was measured. Lower values in this test indicate better adhesive performance.

The ASTM D3121 rolling ball tack test was used in Example 5.

The invention will now be illustrated by the following Examples.

The following general adhesive formulation was used in Examples 1 to 12 and batch sizes of 10 g or 20 g rubber were normally employed.

TABLE 1

General rubber adhesive formulation

| Ingredient | Parts (phr) |
|---|---|
| Natural rubber smoked sheet, Goodyear | 100 |
| Piccolyte S115 Tackifier, Hercules | 62 |
| Zirex (zinc resinate), Reichhol Chem | 6 |
| UCAR CK 1634 Phenolic Resin, Union Carbide | 12 |
| Irganox 1010 antioxidant, Ciba Geigy | 1 |
| Titanox 2020 TiO$_2$ pigment, NL Industries | 0 or 16 |
| Flame retardants | 50 to 100 |
| Toluene | 1200 ml per 100 g rubber |

All the above ingredients were ball milled for at least 2 hours until well dispersed and then knife edge coated onto 1.2 mil (30 μm) PET film (1.0 mil (25 μm) film was used in Examples 8 to 12). Wet coating thicknesses of approximately ten times the final required adhesive layer thickness were used.

The coatings were dried in an oven at approximately 85° C. for at least 10 minutes and then covered with silicone lining paper for storage. Samples were cut into ¾" (19 mm) wide strips and wrapped onto steel rods for UL510 flammability testing. All specimens tested in Examples 1 to 4 passed the US510 test. Neither flaming drips nor burnt paper flags were observed in any of the tests described in Examples 1 to 4.

EXAMPLE 1

Adhesive Tape Formulations Containing SPINFLAM MF82/PP as a Flame Retardant

In this Example, a sample of SPINFLAM MF82/PP flame retardant (Montefluos), supplied with mean particle size approximately 40 microns, was jet milled to reduce its particles size to around 5 microns. It was found that this milling was required in order to produce a smooth adhesive layer with no visible particles. In general, for the 25 micron (1 mil) adhesive layer thickness used here, a particle size of approximately 10 microns or less was found to be suitable.

Flame retardant adhesive tape formulations were then prepared as described above, containing jet milled SPINFLAM MF82/PP as the P/N flame retardant, present at the level of 75 to 100 parts. In some formulations 16 parts of TiO$_2$ was added.

TABLE 2

UL510 flame tests on adhesive tapes containing SPINFLAM MF82/PP

| SPINFLAM loading (parts) | TiO$_2$ loading (parts) | coating thickness (mil) (×25.4 μm) | number of UL510 flame tests | results |
|---|---|---|---|---|
| 100 | 0 | 1.0 | 3 | all pass |
| 100 | 0 | 1.1 | 5 | all pass |
| 100 | 16 | 1.0 | 4 | all pass |
| 75 | 0 | 0.9 | 4 | all pass |
| 75 | 16 | 0.9 | 3 | all pass |
| 75 | 16 | 1.3 | 3 | all pass |

EXAMPLE 2

Adhesive Tape Formulations Containing Exolit IFR-10 as a Flame Retardant

Using the generalized formulation, coating and test procedure of Example 1, formulations containing various loadings of another P/N flame retardant, Exolit IFR-10 (Hoechst-Celanese), were prepared and evaluated (see table). 16 parts $TiO_2$ were added to all formulations.

TABLE 3

UL510 flame tests on formulations containing IFR-10 and $TiO_2$

| loading (phr) | number of tests | results | coating thickness (mil) (×25.4 μm) |
|---|---|---|---|
| 75 | 3 | all pass | 0.6 |
|  | 3 | all pass | 1.0 |
|  | 3 | all pass | 1.6 |
| 70 | 3 | all pass | 0.7 |
|  | 4 | all pass | 1.2 |
|  | 4 | all pass | 1.8 |
| 60 | 3 | all pass | 0.9 |

As may be seen from Table 3, the requirements of the UL510 flame test have been demonstrated for a range of coating thicknesses at 70 and 75 parts IFR-10 loading. Whereas SPINFLAM MF82/PP (supplied with 40 microns mean particle size) requires jet milling before use in these thin coatings, the Exolit IFR-10 (10 microns) was used as supplied. In all cases smooth coatings were obtained after ball milling the coating formulation in toluene for at least 2 hours.

EXAMPLES 3 AND 4

Adhesive Tape Formulations Containing PNA and PNB Flame Retardants

Two P/N flame retardants, PNA and PNB, were evaluated in adhesive coatings at 75 parts total flame retardant loading, using the generalized formulation of Example 1. In each case the flame retardant was a blend of the P/N material with ammonium polyphosphate (APP, Phoschek P40, Durham Chemicals) in a 2:3 ratio by weight, and 16 parts of $TiO_2$ were added. Both PNA and PNB materials were jet milled to around 5 microns per particles size prior to formulation.

PNA is a triazine oligomer prepared as described in Example 3 of EP 0413613A. PNB is a polyphosphonamide prepared from phenylphosphonic dichloride and piperazine, as described in British Patent Application No. 9208926.7.

TABLE 4

UL510 flame tests on formulations containing PNA and PNB flame retardants

| FR additive | loading (parts) | number of tests | results | coating thickness (mil) (×25.4 μm) |
|---|---|---|---|---|
| 2:3 PNA + APP | 75 total | 3 | all pass | 0.7 |
|  |  | 4 | all pass | 1.0 |
|  |  | 4 | all pass | 1.4 |
|  |  | 2 | all pass | 1.8 |
| 2:3 PNB + APP | 75 total | 3 | all pass | 0.6 |
|  |  | 3 | all pass | 1.1 |

Thus, both these flame retardant formulations meet the requirements of the UL510 flame test.

EXAMPLE 5

Adhesion Measurements on IFR-10 Formulation

Rolling ball tack adhesion tests (ASTM D3121) were performed to compare the relative adhesion of a NHIFR based adhesive tape (invention) with a brominated flame retardant based adhesive tape (comparative example). Good adhesion was obtained with both tapes (see Table 5).

The NHIFR tape contains 70 parts Exolit IFR-10 plus 16 parts $TiO_2$ in the adhesive (as in Example 2 above). The brominated tape contains Saytex 102 decabromodiphenyl oxide (Saytech) flame retardant (DBDPO) and antimony trioxide synergist (Anzon) in a 3:1 ratio at a combined loading of 60 parts plus 16 parts $TiO_2$ in the adhesive. Both tapes have an approximately 1 mil (25 μm) thick adhesive layer on PET backing.

TABLE 5

Rolling ball tack measurements on IFR-10 and DBDPO formulations

| Flame retardant | Total flame retardant loading | Approximate roll distance (inches) (×25.4 mm) |
|---|---|---|
| IFR-10 | 70 parts | 5 |
| DBDPO/$Sb_2O_3$ | 60 parts | 4 |

EXAMPLE 6

Cone Calorimeter Evaluation of Smoke and Toxicity (CO Emission)

In order to assess the environmental advantages of a non-halogen adhesive tape over a halogenated formulation, smoke and carbon monoxide emissions were compared using a cone calorimeter for the two adhesive tapes from Example 5. Horizontal samples of 25 layers of tape and an irradiance level of 50 kW m$^{-2}$ were employed. Test duration was 3 minutes.

TABLE 6

Smoke and CO Emission

| | Smoke density ($m^2$/kg) | | CO emission (kg/kg) | |
|---|---|---|---|---|
| Flame retardant | Peak | Mean | Peak | Mean |
| 70 phr IFR-10 | 979 | 846 | 0.06 | 0.05 |
| 60 phr DBDPO/$Sb_2O_3$ | 2224 | 1641 | 0.21 | 0.10 |

These data show a reduction of a factor of two or greater in smoke and toxic CO emission levels for the non-halogen adhesive tape formulation, when compared to the halogenated formulation.

EXAMPLE 7

Corrosivity Testing

Simple copper mirror corrosion tests have been performed on a NHIFR adhesive tape and a halogenated formulation. The tape formulations from Example 5 were used. For each material, approximately 1 g of tape was burnt in a Stanton Redcroft FTA limiting oxygen index apparatus and the smoke sealed overnight in an FTB smoke chamber into which a copper mirror had been placed. Extensive pitting was seen on the mirror exposed to smoke from the brominated formulation, whereas no pitting was observed for the non-halogen formulation.

EXAMPLE 8

Combinations of Non-Halogen and Brominated Flame Retardants

Adhesive tapes utilizing an NHIFR material, either jet milled SPINFLAM MF82/PP (MJSPP in the table), or Exolit IFR-10, or CN1197 (Great Lakes) in combination with Saytex 102 DBDPO (Saytech) were tested to UL510 ($TiO_2$ was not added).

TABLE 7

Combinations of non-halogen flame retardants with DBDPO

| DB/NH ratio | DBDPO (phr) | non-halogen flame retardant (phr) | $Sb_2O_3$ (phr) | Total FR (phr) | Wet coating thickness (mil) (×25.4 μm) | UL510 passes/ tests |
|---|---|---|---|---|---|---|
| 4:1 | 48 | JMSPP 12 | 0 | 60 | 20 | 1/3 |
| | | | | | 15 | 3/3 |
| | | | | | 11 | 3/3 |
| | | | | | 7 | 3/3 |
| 3:2 | 36 | JMSPP 24 | 0 | 60 | 20 | 3/3 |
| | | | | | 15 | 3/3 |
| | | | | | 11 | 3/3 |
| | | | | | 7 | 3/3 |
| 3:2 | 36 | CN1197 24 | 0 | 60 | 20 | 2/3 |
| | | | | | 15 | 3/3 |
| | | | | | 11 | 3/3 |
| | | | | | 7 | 3/3 |
| 3:2 | 36 | IFR10 24 | 0 | 60 | 20 | 1/3 |
| | | | | | 15 | 2/3 |
| | | | | | 11 | 3/3 |
| | | | | | 7 | 3/3 |
| 1:1 | 30 | JMSPP 30 | 0 | 60 | 20 | 1/3 |
| | | | | | 15 | 3/3 |

The data in the Table indicate that good performance in this flame test is obtained over a range of adhesive coating thicknesses using combinations of DBDPO with any of these three NHIFR materials at a total flame retardant level of 60 phr. The tendency to pass this test is reduced in some cases if the adhesive wet coating thickness is increased to around 20 mil (508 μm).

The optimum performance is obtained using SPINFLAM MF82/PP with a ratio of around 3 DBDPO:2 SPINFLAM, and this particular blend demonstrates improved performance over combinations with lower or higher DBDPO:SPINFLAM ratios, and also over 3:2 blends of DBDPO with the other two NHIFRs evaluated in the Table. This particular synergistic effect was unexpected.

EXAMPLE 9

Comparative Example—Brominated Flame Retardant

An adhesive tape formulation containing DBDPO and antimony trioxide (Anzon) synergist was prepared for comparison with the DBDPO/NHIFR blends examined in Example 8 above.

TABLE 8

UL510 flame tests on brominated adhesive tapes

| DBDPO parts | $Sb_2O_3$ parts | Total FR (parts) | $TiO_2$ parts | Coating thickness (mil) (×25.4 μm) | | UL510 passes/ tests |
|---|---|---|---|---|---|---|
| | | | | wet | dry | |
| 44.2 | 14.8 | 59 | 16 | 16 | 2.6 | 1/2 |
| | | | | 11 | 1.9 | 1/2 |
| | | | | n/d* | 1.5 | 73/83 |
| | | | | 6 | 1.1 | 2/2 |
| | | | | 3 | 0.5 | 3/3 |

*n/d = not determined

This type of brominated formulation suffers from the limitation that it has a tendency to fail the UL510 flammability test because of emission of flaming drips (see Table). The blends of DBDPO with NHIFRs examined in Example 8 above show improved performance over this comparative example.

EXAMPLE 10

Comparative Example—No Flame Retardant Added

A batch of adhesive containing no flame retardant and no $TiO_2$ was made and coated at about 1.1 mil (28 μm) dry adhesive thickness. On the first ignition in UL510 testing it burned for 155 seconds with flaming drips, showing that the addition of a flame retardant is necessary.

EXAMPLE 11

Comparative Example—Alumna Trihydrate

A formulation containing 100 parts of SB632 alumina trihydrate (Solem Industries) flame retardant, with no $TiO_2$ added was prepared. Adhesive thicknesses (dry) of 0.8, 1.1 and 1.8 mil (20,28 and 46 μm) were coated on 1 mil (25 μm) polyester. All tapes prepared had burn times greater than 80 seconds on first and second ignition, i.e. failed in UL510 tests.

EXAMPLE 12

Comparative Example—Ceepree C-200

A batch was prepared containing 80 parts Ceepree C-200 (ICI) (no $TiO_2$ added). Ceepree C-200 is ceramic powder which is a mixture of glass frits, designed to melt and form a non-combustible coating when exposed to heat. The adhesive was coated at 20, 11, 7 and 5 mil (508, 254, 178 and 102 μm) wet thicknesses and the resulting tapes were tested to UL510. Each test failed, usually on the first ignition.

In the following Examples 13 to 17 two different acrylic adhesives were used.

Base Adhesive A

A copolymer of 98% isooctyl acrylate with 2% acrylic acid.

Base Adhesive B

A terpolymer of 93.75% isooctyl acrylate, 6% acrylic acid and 0.25% glycidyl methacrylate.

The phosphorus/nitrogen flame retardants used in the Examples were:

Exolit IFR-10 commercially available from Hoechst Celanese.

Poly(allylammonium) pyrophosphate (PAP).

(Example 1 of British Patent Application No. 9223792.4).

A comparative composition containing halogenated flame retardants with the flame retardant additive consisting of a total of 60 parts by weight, with respect to 100 parts acrylic adhesive, of a mixture of decabromodiphenyl oxide, antimony trioxide and titanium dioxide in the proportions 25:7:25 was used. This halogenated flame retardant mixture which is in accordance with U.S. Pat. No. 4,061,826 is referred to as DB.

Adhesive compositions were coated out onto the polyester backing by means of knife edge coating from a solvent consisting of 227.1 parts ethyl acetate and 177.2 parts n-hexane, with respect of 100 parts of Base Adhesive A or B.

Non-halogen adhesive compositions consisted of 100 parts Base Adhesive A or B with between 0 and 100 parts of phosphorus/nitrogen flame retardants and no other additives.

All formulations were ball milled for at least two hours to ensure good dispersion and then knife edge coated onto 1.2 mil (30 $\mu$m) thick PET. Wet coating thicknesses of 10 mil (250 $\mu$m) were employed, giving a final adhesive layer thickness of approximately 1 mil (25 $\mu$m).

After drying, samples were cut into ¾ inch (1.9 cm) wide strips and wrapped onto steel rods for UL510 flammability testing.

EXAMPLE 13

Adhesive formulations containing Exolit IFR-10 as the flame retardant additive.

Formulations were prepared containing 60 parts Exolit IFR-10 as the flame retardant additive in 100 parts Base Adhesive B. Mixing, coating and evaluation were performed as described above. UL510 flammability test results were as follows:

| Number of tests performed | Results |
|---|---|
| 3 | All pass |

Hence this formulation has been demonstrated to meet the requirements of the UL510 flammability test.

EXAMPLE 14

Adhesive formulations containing Exolit IFR-23 as the flame retardant additive.

Formulations were prepared containing 60 parts Exolit IFR-23 as the flame retardant additive in 100 parts Base Adhesive A using the same methods as in Example 13. UL510 flammability test results were as follows:

| Number of tests performed | Results |
|---|---|
| 3 | All pass |

Hence this formulation has been demonstrated to meet the requirements of the UL510 flammability test.

EXAMPLE 15

Adhesive formulations containing PAP as the flame retardant additive.

Formulations were prepared containing 50 parts PAP as the flame retardant in Base Adhesive B using the same methods as in Example 13. UL510 flammability test results were as follows:

| Number of tests performed | Results |
|---|---|
| 3 | All pass |

Hence this formulation has been demonstrated to meet the requirements of the UL510 flammability test.

EXAMPLE 16

Adhesion testing of Exolit IFR-10 formulation.

Adhesion measurements were performed by means of the rolling tube tack test for a tape sample containing 100 parts base Adhesive A with 60 parts Exolit IFR-10 as the flame retardant adhesive and also for a tape sample containing 100 parts Base Adhesive A with 57 parts halogenated flame retardant additives as described above as a comparison. Both samples comprised an additional thin layer (approximately 5 $\mu$m) of Spray Mount™ adhesive.

| Test sample | Additive loading/ parts | Approximate roll distance (inches) |
|---|---|---|
| Base adhesive A/IFR-10 | 60 | 6.5 |
| Base adhesive B/DB | 57 | 4.0 |

Hence the adhesive properties of the 100 parts Base Adhesive A/60 parts of Exolit IFR-10 formulation are comparable to that of the halogenated composition. The adhesion of the comparative halogenated composition is considerably in excess of that required to meet rolling ball tack tests such as ASTM D3121.

EXAMPLE 17

Adhesive performance of top coated specimens versus non-top coated specimens.

Adhesion measurements, according to the rolling tube tack test, were performed for a specimen of 100 parts Base Adhesive A containing 60 parts IFR-10 with and without a top coat layer of non-flame retardant adhesive, Spray Mount™ adhesive, commercially available from Minnesota Mining and Manufacturing Company. The results were as follows:

| Test specimen | Approximate roll distance (inches) |
|---|---|
| top coat | 6.5 |
| no top coat | >20 |

The addition of a thin top coat layer (approximately 5 microns) of non-flame retardant, pressure-sensitive adhesive considerably improves the tackiness of the composition.

EXAMPLE 18

UL510 flammability performance of top coated specimens versus non-top coated specimens.

The tape samples of Example 17 were subjected to UL510 flammability testing and the results were as follows:

| Test specimen | Number of tests | Classification |
|---|---|---|
| no top coat | 3 | all pass |
| top coat | 3 | all pass |

Thus, the top coat layer has minimal effect upon flammability performance.

EXAMPLE 19

Smoke and toxicity performance of halogenated and non-halogenated compositions.

Adhesive tape materials as described in Example 18 were evaluated on a cone calorimeter at an external irradiant flux of 50 kW m$^{-2}$. Smoke performance was evaluated by means of determination of the average specific extinction are (SEA, in m$^2$ kg$^{-1}$). Toxicity performance was assessed by means of the average yield of carbon monoxide (CO, in kg per kg of sample burned) during the test. These data are as follows:

| Flame retardant | Smoke average SEA/m$^2$ kg$^{-1}$ | Toxicity average CO/kg kg$^{-1}$ |
|---|---|---|
| Exolit IFR-10 | 271 | 0.033 |
| DB | 724 | 0.135 |

Hence the non-halogen material displays much lower smoke and carbon monoxide production than the halogenated equivalent.

In Examples 20–23 all samples were based on an acrylic adhesive foam, of the type described in, for example, U.S. Pat. No. 4,223,067 and comprising:

| 94.5/5.5 | Isooctylacrylate/acrylic acid copolymer (total 100 parts) |
|---|---|
| 6 parts | Glass microspheres |
| 0.30 parts | Irgacure 651 (Ciba Geigy) |
| 0.10 parts | Hexanediol diacrylate |

Flame retardant additives were incorporated into samples of this composition as disclosed hereinafter and tapes were prepared by coating approximately 1 mm thick between two poly(ethylene terephthalate) PET release liners and UV curing at 1.5 mW cm$^{-2}$ average intensity.

Principal evaluations were conducted using the cone calorimeter. Materials were evaluated using an external irradiant flux of 50 kW m$^{-2}$. It was found to be very difficult to remove both PET release liners from the specimen and avoid disintegration so as a matter of course samples were tested with one PET layer still in place, this forming the lower (unexposed) surface. Materials were generally tested in duplicate or triplicate, dependent upon the repeatability of the first two runs. In all cases results are quoted as mean values for the runs undertaken.

Foam tapes were prepared using the above adhesive and the flame retardant indicated below:

a) Control no flame retardant phosphorus/nitrogen containing materials.

b) 30% PAP:P-40

4:1 blend of PAP [polyallylammonium pyrophosphate] (titanate surface treated with Kenrich KR 38 S commercially available from Kenrich Petrochemicals Inc.) with ultra fine grade ammonium polyphosphate (Phoschek P-40 commercially available from Durham Chemicals).

c) 30% IFR-10 a flame retardant commercially available from Hoechst Celanese under the trade name EXOLIT IFR-10.

d) 30% IFR-23 a flame retardant commercially available from Hoechst Celanese under the trade name EXOLIT IFR-23.

e) 30% DB:ATO

30% decabromodiphenyl oxide:antimony trioxide [3:1]

f) 30% ATH

30% alumina trihydrate (Lonza Martinal OL-107C, stearic acid treated).

The following tape material was also tested:

g) 3071 FR

Avery Dennison FasTape 3071 acrylic tape. This material was examined as a 14 layer laminate of thickness approximately 1 mm to correspond with the other specimens.

EXAMPLE 20

UL94 Tests

UL94 tests were conducted on materials a) to f) as described above. For the control, not only did the drips ignite the gauze, but the flame continued to travel up the specimen (pat the five inches mark). All samples containing flame retardants extinguished before the five inches mark.

EXAMPLE 21

Cone Calorimeter Performance

Cone calorimeter tests were conducted on materials a) to g) and date for each of the materials is reported in the following Table.

TABLE

| Material | RHR peak | RHR average | SEA average | CO average |
|---|---|---|---|---|
| Control | 495 | 133 | 481 | 3.43 |
| 3071 FR | 297 | 95 | 998 | 11.00 |
| 30% DB:ATO | 187 | 87 | 1145 | 15.34 |
| 30% PAP:P-40 | 192 | 114 | 702 | 4.01 |
| 30% IFR-10 | 233 | 91 | 473 | 3.21 |
| 30% IFR-23 | 220 | 83 | 504 | 2.60 |
| 30% ATH | 389 | 134 | 390 | 3.61 |

RHR peak=peak rate of heat release (kW m$^{-2}$)

RHR average=average rate of heat release (kW m$^{-2}$)

SEA average=average specific extinction area (m$^2$ kg$^{-1}$)

CO average=average yield of carbon monoxide (cg g$^{-1}$)

In all cases average values are quoted over the range from ignition to ignition plus 3 minutes.

Rate of Heat Release

Figure 1:
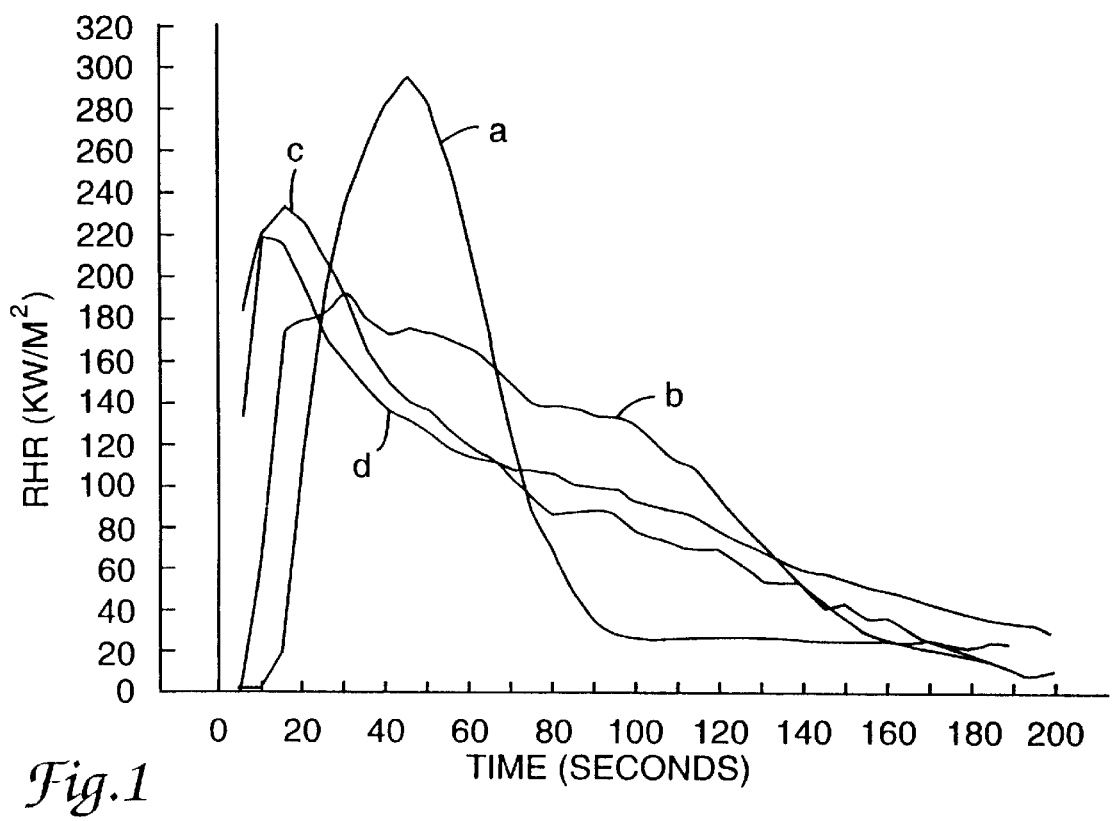

Rate of heat release data has been plotted in FIGS. 1 and 2. FIG. 1 shows comparative data for each of the phosphorus/nitrogen materials alongside the 3071 FR material. FIG. 2 shows the comparison between PAP:P-40 and 3071 FR with greater clarity.

These Figures illustrate that the three phosphorus/nitrogen flame retardants all show improved rate of heat release performance over the halogenated 3071 FR material. Of these, PAP:P-40 exhibits the best performance because, although it shows higher heat release during most of the test than the Exolit IFR materials, its peak RHR is lower and the time to peak RHR is longer. Both of these factors are advantageous in a real fire scenario, as they will decrease the flashover speed.

Similar comments can be applied to the comparison between PAP:P-40 and DB:ATO, as although the P/N compound shows higher heat release at longer time, the peak RHR and time to peak RHR values for the two materials are virtually identical, so their real fire performances would be expected to be comparable. The strength of the P/N materials is of course that this good rate of heat release performance is allied to excellent smoke and toxicity characteristics, as discussed below.

Specific Extinction Area

Figure 3:
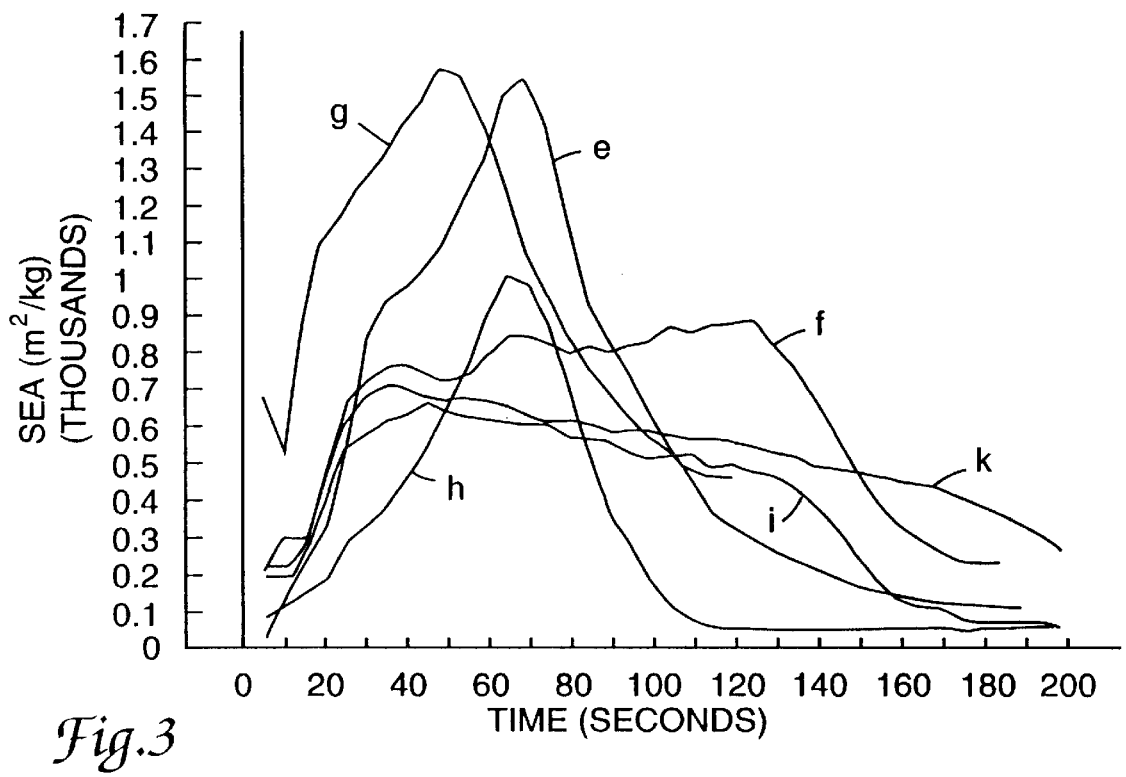
FIGS. 3 and 4 are graphical representations of specific extinction area data for compositions of the present invention.
Figure 4:
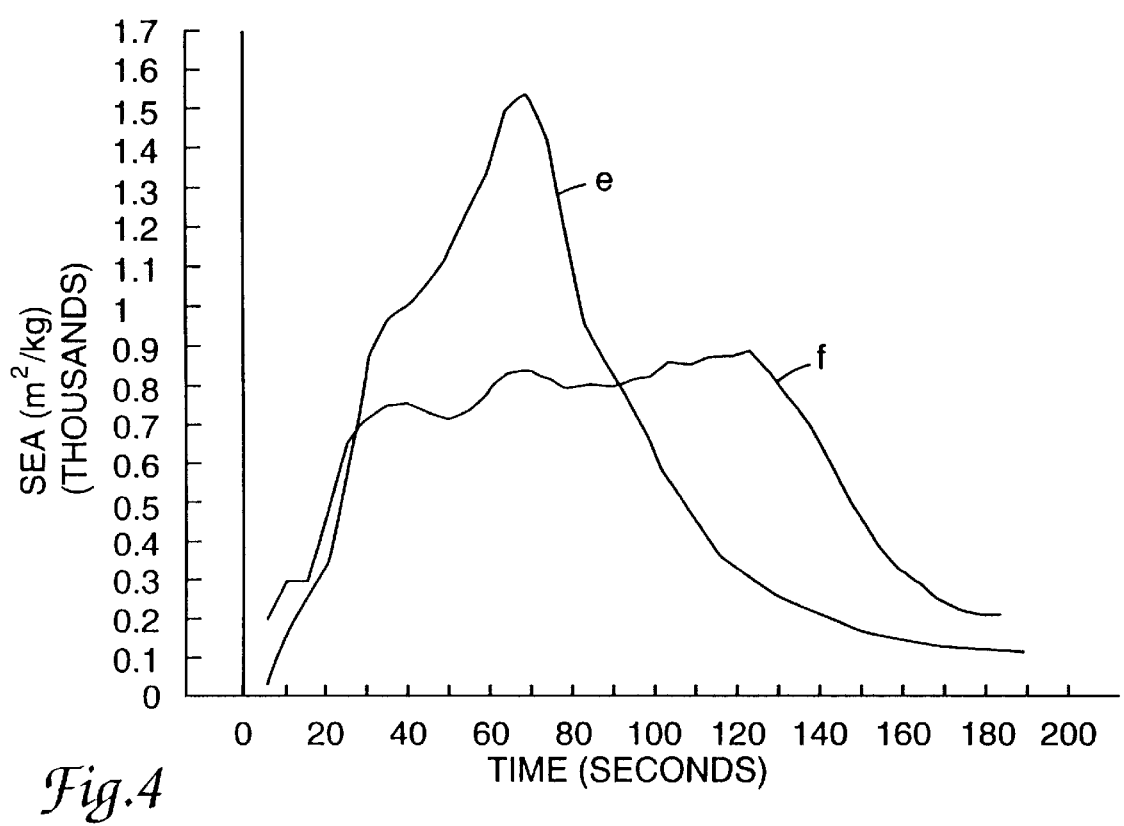

Specific extinction area data is illustrated in FIGS. 3 and 4. FIG. 3 shows plots for all the materials evaluated with the exception of ATH. FIG. 4 compares the behavior of PAP:P-40 with that of 3071 FR. It is evident that all of the P/N additives show much better performance as regards smoke propensity than their halogenated counterparts, with Exolit IFR-10 exhibiting marginally the best performance. While the P/N additives are all higher smoke materials than ATH at this loading, ATH is a very poor performer in terms of rate of heat release. The key advantage of P/N materials is that they show desirable properties in all fire characteristics.

Carbon Monoxide

Figure 5:
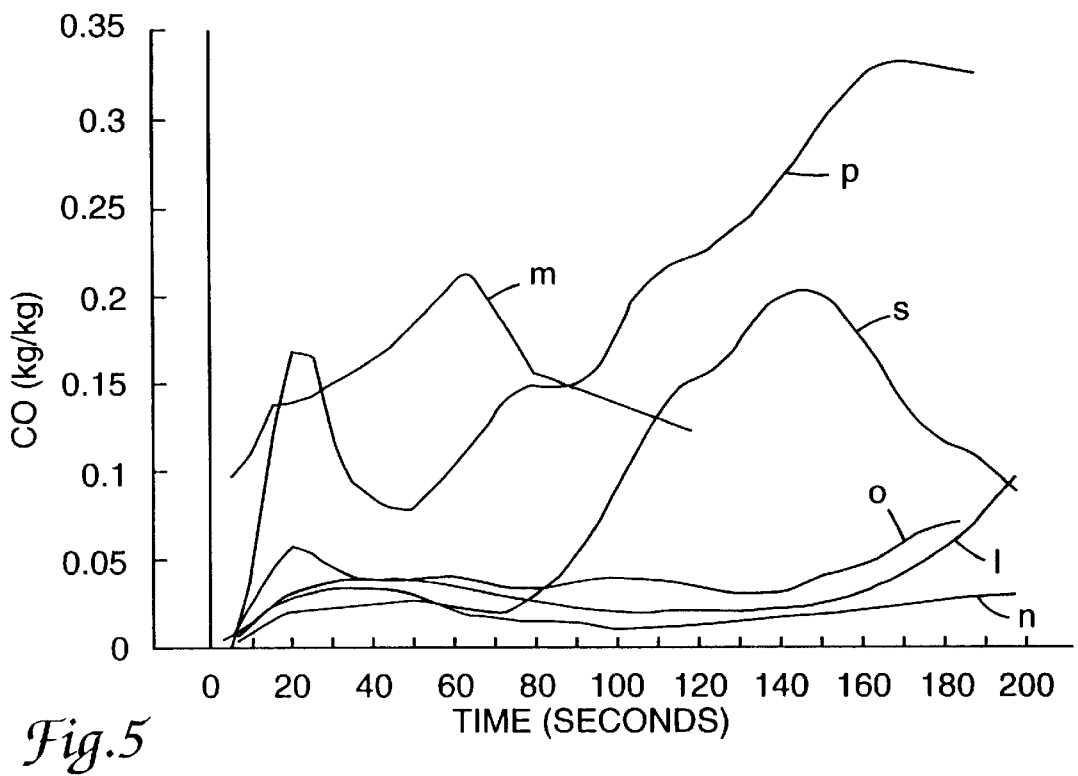
FIGS. 5 and 6 are graphical representations of carbon monoxide yield data for compositions of the present invention.
Figure 6:
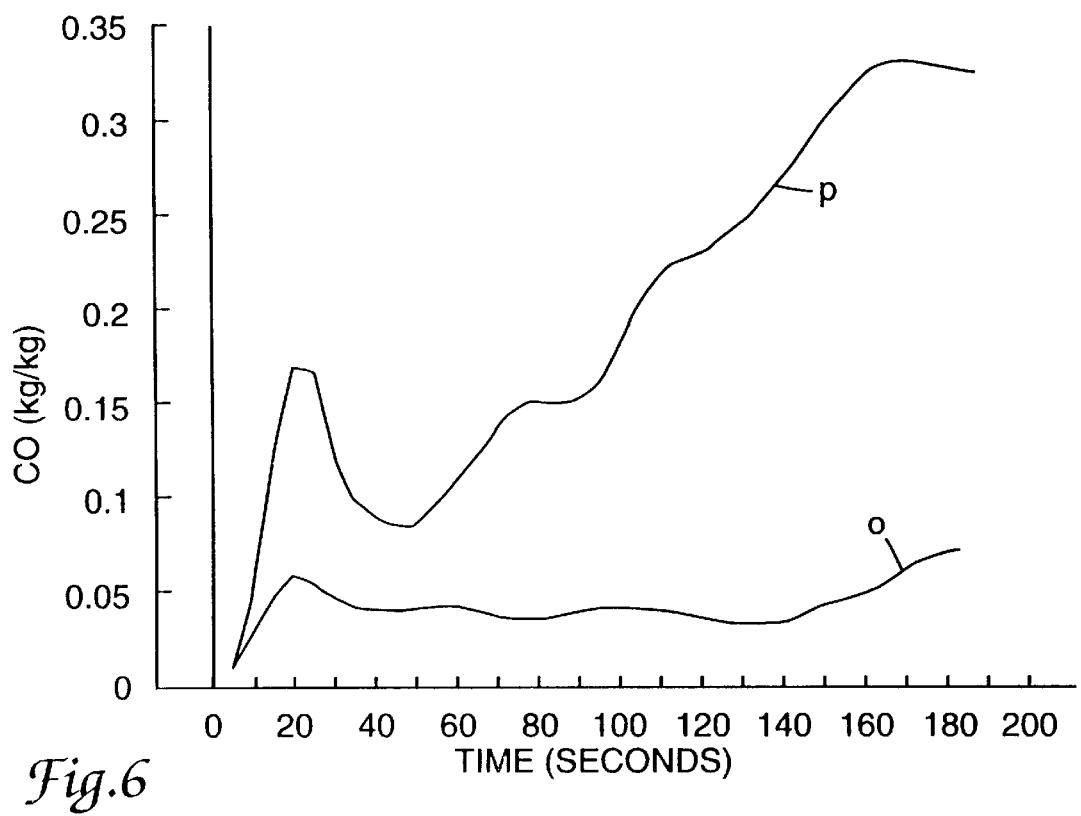

FIG. 5 shows plots for all materials with the exception of ATH; FIG. 6 providing a comparison between PAP:P-40 and 3071 FR. The halogenated materials, either containing DB:ATO or 3071 FR, both produce very high yields of carbon monoxide throughout the test. This compares with the very low yields of carbon monoxide generated by the phosphorus/nitrogen intumescent type flame retardants. Although there are a multiplicity of toxic species in the cocktail of combustion products that arise from any fire, carbon monoxide is invariably of most importance due to its presence in large amounts and human inability to detect it by means of odor, irritance, etc.

The overall results demonstrate the great utility of phosphorus/nitrogen flame retardants, in that they provide a route to low heat release materials, comparable in this respect with halogenated additives, while showing excellent smoke and carbon monoxide performance, comparable to inorganic additives, such as, alumina trihydrate.

EXAMPLE 22

Adhesive Tack Performance of Acrylic Foams

Adhesive tack measurements were performed by means of the rolling tube tack test. A clean tube was released onto the foam surface from a set distance at a set height and the distance covered by the tube before coming to rest was measured as described above. Specimens consisted of strips of width 1 inch (2.54 cm), securely fastened to the bench surface. Rolling tube results are listed.

Adhesive Tack Performance of Acrylic Foams

| Material | Number of tests | Average roll distance/mm |
|---|---|---|
| Control | 5 | 19 |
| 30% PAP:P-40 | 4 | 17 |
| 30% IFR-10 | 4 | 21 |
| 30% DB:ATO [3:1] | 4 | 43 |

The results demonstrate the phosphorus/nitrogen flame retardant additives do not seriously detract from the adhesive tack of the composition, with the PAP:P-40 additive actually improving the tack. Furthermore, the phosphorus/nitrogen additives show considerably improved adhesive tack test performance over the halogenated flame retardant composition.

EXAMPLE 23

Peel Adhesion and Static Shear Performance

Four tests were performed on a variety of specimens:

a) 90° peel adhesion, 20 minute dwell;

b) 90° peel adhesion, 72 hour dwell;

c) static shear, 1 inch×½ inch (2.54 cm×1.27 cm), 1 kg, room temperature; and d) static shear, 1 inch×½ inch (2.54 cm×1.27 cm), 500 g, 70° C.

Test methods were as follows:

Peel adhesion

A 0.5 inch (1.27 cm) wide strip of foam tape was applied to a clean 2 inch×6 inch (5.1 cm×15.2 cm) stainless steel panel and rolled down with a 4.5 lb. (2.04 kg) roller. The liner was removed and a 0.005 inch (0.13 mm) thick anodized aluminum foil strip applied as above. The sample was then housed in a constant temperature and humidity environment for 24 hours prior to testing. A loop was formed from the aluminum strip (stapled together) from which the specified weight was hung (either 1 kg or 500 g). The time to failure was recorded or until 10,000 minutes was reached.

Tape samples were prepared from the adhesive formulation described above with the flame retardants and amounts reported in the following Table:

| Sample | Flame Retardant | Loading % |
|---|---|---|
| (i) | None | — |
| (ii) | DBDPO:ATO (3:1) | 19 |
| (iii) | DBDPO:ATO (3:1) | 30 |
| (iv) | DBDPO:ATO:ATH (2:1:1) | 20 |
| (v) | IFR-10 | 30 |
| (vi) | IFR-10 | 40 |
| (vii) | IFR-10 | 50 |
| (viii) | ATH | 30 |
| (ix) | ATH | 40 |
| (x) | ATH | 50 |

The peel adhesion and static shear results are reported in the following Table:

| Sample | Test (a) | Test (b) | Test (c) | Test (d) |
|---|---|---|---|---|
| (i) | 66 | 110 | 10,000+ | 10,000+ |
| (ii) | 92 | 121 | 10,000+ | 10,000+ |
| (iii) | not tested | 40 | 10,000+ | 10,000+ |
| (iv) | 55 | 200 | 10,000+ | 10,000+ |
| (v) | 62 | 97 | 10,000+ | 10,000+ |
| (vi) | 62 | 99 | 10,000+ | 10,000+ |
| (vii) | 48 | 114 | 10,000+ | 10,000+ |
| (viii) | 43 | 93 | 10,000+ | 10,000+ |
| (ix) | 42 | 69 | 10,000+ | 10,000+ |
| (x) | 18 | 35 | 10,000+ | 10,000+ |

The data demonstrate that acrylic foams containing a P/N flame retardant such as Exolit IFR-10 show excellent adhesion performance, even at high loadings. Peel adhesion performance is considerably better for the P/N flame retardant than for either the halogenated flame retardant or ATH. Static shear results are good for all materials.

In the following Examples 24–26, tackified acrylic pressure sensitive adhesives were investigated in the presence and absence of a variety of NHIFR materials. The following tackified adhesives were employed:

Adhesive (C): a copolymer of 2-ethylhexyl acrylate (95.5 parts by wt) and acrylic acid (4.5 parts by wt) was prepared as a solution of 25 wt % solids in a mixture of isopropanol and heptane (70:30 by weight). To 76.1 parts by wt of this solution was added 23.9 parts by wt of a solution comprising Foral 85 (46.96 wt %), heptane (30.43 wt %) and toluene (22.61 wt %. (Foral 85 is a hydrogenated rosin ester tackifier supplied by Hercules).

Adhesive (D): Vantac V338j (a water borne acrylic resin, tackified with a rosin derivative) was used as supplied by the manufacturer, Rhone Poulenc.

The following NHIFR materials were added to adhesives (C) and (D) in varying amounts in the range 20–50 phr (parts by wt per hundred parts resin):

Hostaflam AP462 (supplied by Hoechst Celanese) (added either alone or in combination with lesser amounts of Hostaflam RP614, comprising microencapsulated red phosphorus, also supplied by Hoechst Celanese); CP Flam/F (supplied by Nordmann, Rassmann GmbH & Co.); and Phos Check P40 (supplied by Monsanto).

In the case of Adhesive (C), the flame retardants were dispersed in the adhesive solution with high-speed stirring (1500–2000 rpm) and the mixture diluted with heptane (about 30 ml per 130 g adhesive) prior to knife coating on a release liner (silicone treated paper). The coatings were dried for 10 min at ambient temperature, then for 10 min at 70° C. Dry layer thicknesses in the range 70–100 μm were obtained.

In the case of Adhesive (D), the flame retardants were predispersed in water (about 30 ml per 130 g adhesive) and the adhesive added with slow-speed stirring to avoid foaming. After stirring for 1 day, the mixture was knife coated on siliconised paper as before, and dried for 10 min at 100° C.

For testing, samples of the coatings were cut to the desired size, the adhesive was laminated to the desired substrate, and the release liner removed. Thereafter, a second substrate was laminated to the exposed adhesive surface.

EXAMPLE 24

The Vertical Burn Test (in accordance with FAR 25.853) was performed on samples of polyethylene foam (2 mm thickness) laminated to aluminium foil (25 μm thickness), using adhesives (C) and (D) with and without added NHIFR materials, giving the results tabulated below. For samples subjected to 19 sec flame exposure, "after flame time" refers to the time taken to self-extinguish after removal of the Bunsen flame. All samples subjected to 60 sec flame exposure self-extinguished within that time, and "S/E time" refers to the time taken to self-extinguish from initial application of the Bunsen flame. "Burn length" refers to the length of the sample consumed. All samples measured 300×70 mm initially.

| Adhesive | FR Material | FR concn (phr) | Flame Exp. Time (sec) | Burn Length (mm) | After Flame Time (sec) | S/E Time (sec) |
|---|---|---|---|---|---|---|
| C | — | — | 12 | 184 | 36 | — |
| C | — | — | 60 | 205 | — | 30 |
| C | AP462 | 20 | 12 | 166 | 3 | — |
| C | AP462 | 40 | 12 | 155 | 1 | — |
| C | AP462 | 40 | 60 | 169 | — | 23 |
| C | AP462 + RP614 | 20 + 2 | 60 | 179.5 | — | 25.5 |
| C | CP Flam/F | 30 | 12 | 169 | 4 | — |
| C | CP Flam/F | 30 | 60 | 197 | — | 25 |
| C | CP Flam/F | 50 | 12 | 171 | 2 | — |
| C | CP Flam/F | 50 | 60 | 169 | — | 17 |
| C | P-40 | 30 | 12 | 165 | 5 | — |
| C | P-40 | 30 | 60 | 177 | — | 29 |
| C | P-40 | 50 | 12 | 154 | 4 | — |
| C | P-40 | 50 | 60 | 190 | — | 28 |
| D | — | — | 12 | 169 | 24 | — |
| D | — | — | 60 | 228 | — | 30 |
| D | AP462 | 30 | 12 | 154 | 2 | — |
| D | AP462 | 30 | 60 | 206 | — | 26 |
| D | AP462 | 50 | 60 | 189 | — | 24.5 |
| D | CP Flam/F | 40 | 12 | 169 | 3 | — |
| D | CP Flam/F | 40 | 60 | 215 | — | 25 |
| D | P-40 | 30 | 12 | 174 | 2 | — |
| D | P-40 | 30 | 60 | 193 | — | 25 |
| D | P-40 | 50 | 12 | 153 | 2 | — |
| D | P-40 | 50 | 60 | 177 | — | 23 |

The results show that even at relatively low loadings (20–30 phr), a significant improvement in flame retardant properties is provided by the NHIFR materials.

EXAMPLE 25

This example demonstrates the good adhesive properties of flame retardant pressure sensitive adhesives in accordance with the invention. Samples of adhesives (with and without added NHIFR materials) were applied as strips one inch (2.54 cm) wide on a cleaned aluminium panel, then a strip of Nomex textile material of the same width was laminated on top of the adhesive. (Nomex textile material is used as a wall covering in aircraft cabins and is supplied by Moebel-stoffe Langenthal AG). After conditioning for 10 minutes at 70° C. and 3 days at room temperature, the 90° peel force was measured for a peal rate of 100 mm/min, giving the results tabulated below.

| Adhesive | FR Material | FR Concn. (phr) | Peel Force (N/inch) |
|---|---|---|---|
| C | — | — | 9.95 |
| C | AP462 | 30 | 5.76 |
| C | AP462 | 50 | 5.67 |
| C | AP462 + RP614 | 20 + 2 | 10.66 |
| C | CP Flam/F | 40 | 11.1 |
| C | P-40 | 30 | 7.0 |
| C | P-40 | 50 | 8.4 |
| D | — | — | 9.12 |
| D | AP462 | 30 | 9.26 |
| D | AP462 | 50 | 7.62 |
| D | CP Flam/F | 40 | 9.30 |
| D | P-40 | 30 | 7.59 |
| D | P-40 | 50 | 7.86 |

In most cases, the peel force was little affected by the addition of the NHIFR material, and in some cases was actually increased.

In a further test of adhesive properties, the flame retarded pressure sensitive adhesive compositions listed above were applied to one-inch wide strips of polyethylene foam of 10 mm thickness, which were then laminated to an aluminium panel. After conditioning for 3 days at ambient temperature, the strips were peeled manually. In all cases, this caused splitting of the foam, with the adhesive interface remaining intact.

As an extension of this test, identical adhesive-coated foam strips were wrapped round an aluminium pipe of 250 mm external diameter and stored at 85° C. for 3 days. This tested the ability of the adhesive bond to resist the peeling force exerted by the natural resilience of the foam, any tendency for failure being evidenced by lifting of the edges of the foam strip. The combination of Adhesive (D) and AP462 (at both 30 and 50 phr) failed this test, but all others passed, with a maximum of 5 mm of edge lifting observed.

EXAMPLE 26

This example demonstrates the intumescent properties of the flame retardants used in the two previous examples. Successive layers of an adhesive composition to be tested were transferred from siliconised release liner to a glass slide until a thickness of about 0.5–1.0 mm was built up. The exact thickness was measured before transfer to a cold oven which was then set to 350° C. After one hour, the thickness of the resulting charred layer was measured, and this figure divided by the initial thickness gave the degree of intumescence. As shown in the following table, all three materials caused a significant degree of expansion.

| Adhesive | FR Material | FR Concn (phr) | Initial Thickness (mm) | Char Thickness (mm) | Intumescence (times) |
| --- | --- | --- | --- | --- | --- |
| C | AP462 | 50 | 0.8 | 5.9 | 7.4 |
| D | CP Flam/F | 40 | 0.4 | 3.1 | 7.5 |
| C | P-40 | 50 | 0.7 | 3.1 | 4.4 |

What is claimed is:

1. A pressure-sensitive adhesive composition comprising an adhesive selected from the group consisting of rubber resin adhesives and acrylic adhesives containing from about 10 to about 60% by weight of the adhesive of a non-halogen intumescent flame retardant.

2. A pressure-sensitive adhesive composition according to claim 1 which comprises a rubber elastomer selected from crude natural rubber, styrene-butadiene, polybutadiene, polyisobutylene and polysiloxane.

3. A pressure-sensitive adhesive composition according to claim 2 which additionally comprises from 40 to 150 parts tackifying resin by weight per 100 parts by weight of rubber elastomer, said tackifying resin being selected from the group consisting of glyceryl esters of hydrogenated resin, thermoplastic terpene resins, petroleum hydrocarbon resins, coumarone-indene resins, synthetic phenol resins, polybutenes and silicone resins.

4. A pressure-sensitive adhesive composition according to claim 1 in which the acrylic adhesive is selected from the group consisting of homopolymers and copolymers of acrylic acid, methacrylic acid, isooctyl acrylate, acrylamide, methacrylamide, acrylonitrile, methacrylonitrile, methyl isoamyl acrylate and 2-ethyl hexylacrylate.

5. A pressure-sensitive adhesive composition according to claim 1 in which the flame retardant additive is selected from the group consisting of a nitrogen containing oligomer and ammonium polyphosphate.

6. A pressure-sensitive adhesive composition according to claim 5 in which the flame retardant additive additionally comprises melamine cyanurate and a hydroxyalkyl derivative of isocyanuric acid, at least partially in the form of a homopolymer.

7. A pressure-sensitive adhesive composition according to claim 6 wherein said flame retardant additive comprises a phosphorus containing oligomer having a triazine nucleus.

8. A pressure-sensitive adhesive composition according to claim 7 wherein said the flame retardant additive comprises a polyphosphonamide containing oligomer having a triazine nucleus.

9. A pressure-sensitive adhesive composition according to claim 1 wherein said flame retardant additive comprises a polymeric salt containing both phosphorus and nitrogen.

10. A pressure-sensitive adhesive composition according to claim 1 wherein said non-halogen intumescent flame retardant comprises a phosphate salt of a polyol.

11. A pressure-sensitive adhesive composition according to claim 1 further comprising an additional flame retardant.

12. A pressure-sensitive adhesive composition according to claim 11 in which said further flame retardant is a halogenated polynuclear aromatic ether.

13. A pressure-sensitive adhesive composition according to claim 12 in which said further flame retardant is decabromodiphenyl oxide, said retardant being present in an amount of 30 to 50% by weight of the adhesive.

14. A pressure-sensitive adhesive tape comprising a backing bearing a layer of pressure-sensitive adhesive according to claim 1, said adhesive layer having a thickness of up to 5 mm.

15. A pressure-sensitive adhesive tape according to claim 14 which additionally comprise an outer layer of pressure-sensitive adhesive having a thickness of less than 125 μm.

16. A pressure-sensitive adhesive tape according to claim 15 in which the backing is selected from glass cloth, polyethylene terephthalate, polyimide and polyolefin.

17. The pressure sensitive adhesive composition according to claim 1 which comprises a foam pressure-sensitive adhesive.

* * * * *